UNITED STATES PATENT OFFICE 2,602,081

ACID DISAZO DYESTUFFS

Franz Frisch, Basel, Switzerland, assignor to Sandoz Limited, Basel, Switzerland, a Swiss firm No Drawing. Application February 14, 1949, Serial No. 76,418. In Switzerland February 17, 1948

4 Claims. (Cl. 260—191)

The present invention relates to new, valuable acid disazo dyestuffs which dye animal fibres in fast violet, blue to black shades and to a process for their manufacture.

It has been found that the new acid disazo dyestuffs may be prepared by coupling diazotized monoazo dyestuffs corresponding to the general formula:

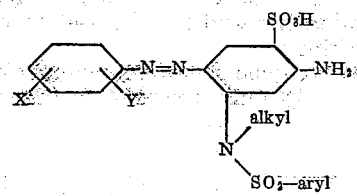

wherein X stands for O-aryl, O-aralkyl,

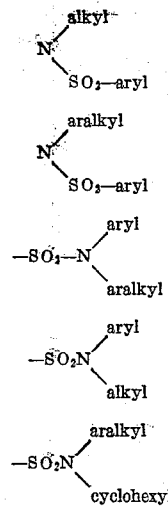

or an alkyl radical with at least five carbon atoms, the aryl radical being, if desired, substituted by alkyl or cycloalkyl radicals, and Y stands for hydrogen, alkyl or halogen, in an acid medium with 2-amino-8-hydroxynaphthalene-6-sulfonic acid or their N-alkyl and N-aryl derivatives.

The disazo dyestuffs thus obtained correspond, therefore, to the general formula:

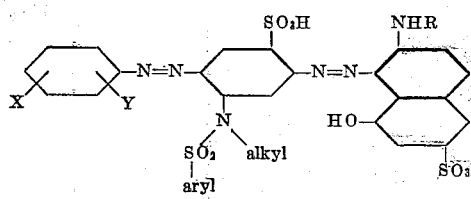

wherein X and Y have the above meanings and R stands for hydrogen, alkyl and aryl.

The dyestuffs falling within the scope of the above general formula dye wool and natural silk from a neutral or a weak acid bath into violet, blue to black shades possessing good fastness properties to alkaline and acid milling, sulfur bleaching and to light.

The monoazo dyestuffs used as starting products in the present process may be prepared by diazotizing an amine of the formula

wherein X and Y stand for the substituents cited above, and coupling the diazo compound thus obtained with 1-amino-3-aryl-sulfoylaminobenzene-6-sulfonic acid, whereupon the product thus obtained will be treated with alkylating agents, in order to introduce an alkyl group into the arylsulfoylamino radical of the coupling component cited above. The monoazo dyestuffs thus obtained will then be used as starting material for the coupling with the 2-amino-8-hydroxy-naphthalene-6-sulfonic acid or its N-alkyl or N-aryl derivatives giving dyestuffs dyeing animal fibres into violet, blue to black shades.

As compared to the known dyestuffs which can be prepared according to German Patent Specification 695,401, the dyestuffs prepared according to the present process possess an improved fastness to milling, a better affinity to the fibres, when applied from a neutral bath, and in some cases a better stability of the shade in artificial light.

The following examples, without being limitative, illustrate the present invention, the parts being by weight.

Example 1

22.2 parts of 2-amino-4-chlorodiphenyl ether are diazotized in the usual manner and coupled in the presence of sodium carbonate with a solution of 34.2 parts of 1-amino-3-(4'-methyl)-phenylsulfoylaminobenzene - 6 - sulfonic acid. After the coupling has finished, the aminoazo dyestuff is separated, dissolved in water with addition of 80 parts of caustic soda lye 30% and treated with 20 parts of dimethyl sulfate until the dyestuff methylated in the substituted amino group precipitates. It is then suspended in water and diazotized at about 5° C. by means of 7 parts of sodium nitrite and 35 parts of concentrated hydrochloric acid. The diazoazo compound which precipitates is filtered and coupled with 24 parts of 2-amino-8-hydroxynaphthalene-6-sulfonic acid in an acetic acid medium. The disazo dyestuff which precipitates is then filtered and constitutes, after drying, a dark powder soluble in water with a blue coloration and dyeing wool and silk from a neutral or a slightly acid dye-bath into blue shades of good fastness to alkaline and acid milling and to light. The dyestuff corresponds to the formula

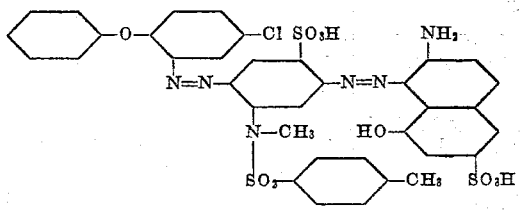

*Example 2*

16.3 parts of p-tert.-amylaniline are diazotized and the diazo solution combined with a sodium carbonate alkaline solution of 34.2 parts of 1-amino-3-(4'-methyl)-phenylsulfoylaminobenzene-6-sulfonic acid. After the coupling is finished, the aminoazo dyestuff is separated and methylated with dimethylsulphate in the manner described in Example 1. It is then further diazotized, the diazoazo compound thus obtained filtered and combined with 35.3 parts of 2-methyl-amino-8-hydroxy-naphthalene-6-sulfonic acid in an acetic acid medium. The disazo dyestuff thus obtained precipitates and is isolated by filtration. In dry state it is a blue powder, soluble in water with a blue coloration. It dyes wool and natural silk from a neutral or a slightly acid dye-bath into blue shades of good fastness to alkaline and acid milling and light.

*Example 3*

18.5 parts of p-aminodiphenyl ether are diazotized and the diazo solution combined with a sodium carbonate solution of 32.8 parts of 1-amino-3-phenylsulfoylaminobenzene-6-sulfonic acid. After completion of the coupling the aminoazo dyestuff is isolated by filtration, dissolved in water under addition of 80 parts of caustic soda lye 30% and treated at room temperature with 22 parts of diethyl sulfate, until the dyestuff ethylated only in the phenylsulfoylamino group precipitates. It is then filtered, suspended in water and diazotized by means of 7 parts of sodium nitrite and 35 parts of concentrated hydrochloric acid. The diazo compound thus obtained is filtered and coupled in an acid medium with 32.5 parts of 2-o-tolylamino-8-hydroxynaphthalene-6-sulfonic acid. The disazo dyestuff thus obtained is then salted out, filtered and dried. It is soluble in water with a blue coloration and dyes wool and silk from a neutral or slightly acid dyebath into full black shades of good fastness to sulfur bleaching and milling and very good fastness to light.

The following table shows the manufacture of further disazo dyestuffs according to the present invention.

| | Aminoazo dyestuff | Coupling Component | Shade on wool |
|---|---|---|---|
| 1 | | 2-amino-8-hydroxynaphthalene-6-sulfonic acid | blue. |
| 2 | | id. | reddish blue. |
| 3 | | id. | greenish blue. |
| 4 | | id. | reddish blue. |

| | Aminoazo dyestuff | Coupling Component | Shade on wool |
|---|---|---|---|
| 5 | 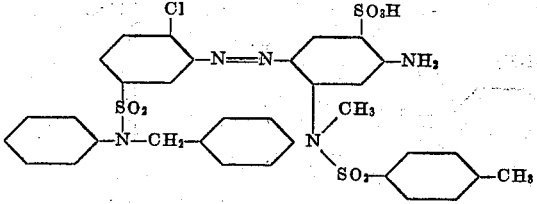 | id. | greenish blue. |
| 6 | 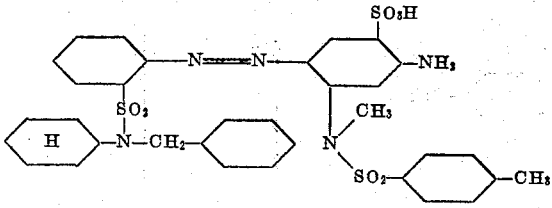 | id. | blue. |
| 7 | 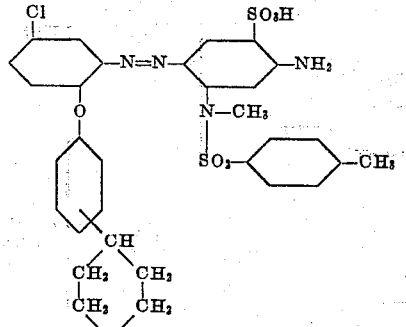 | id. | blue. |
| 8 | 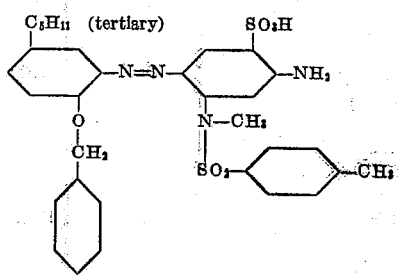 | id. | reddish blue. |
| 9 | 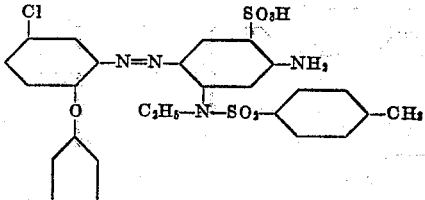 | id. | blue. |
| 10 | 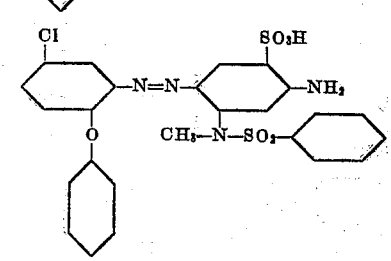 | id. | blue. |
| 11 | 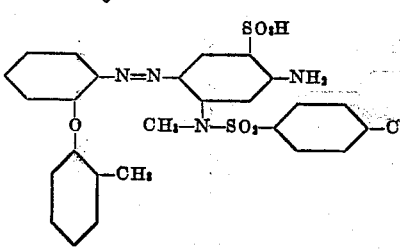 | id. | blue-violet. |

| | Aminoazo dyestuff | Coupling Component | Shade on wool |
|---|---|---|---|
| 12 | (structure) | id. | blue. |
| 13 | (structure) | id. | blue. |
| 14 | (structure) | id. | blue. |
| 15 | (structure) | id. | greenish blue. |
| 16 | (structure) | id. | violet. |
| 17 | (structure) | id. | blue. |
| 18 | (structure) | id. | blue. |
| 19 | (structure) | id. | blue. |
| 20 | (structure) | id. | reddish blue. |

| | Aminoazo dyestuff | Coupling Component | Shade on wool |
|---|---|---|---|
| 21 | [structure] | 2-p-tolylamino-8-hydroxy-naphthalene-6-sulfonic acid. | greenish black. |
| 22 | [structure] | id. | black. |
| 23 | [structure] | 2-(trimethyl-phenyl)-amino-8-hydroxy-naphthalene-6-sulfonic acid. | reddish black. |

The dyestuff corresponding to item 7 of the foregoing table corresponds to the formula:

[structure]

The dyestuff corresponding to item 8 of the foregoing table corresponds to the formula:

[structure]

What I claim is:

1. Acid disazo dyestuffs of the general formula

[structure]

wherein X stands for one substituent selected from the group consisting of

—O—aryl—$R_1$, —O—aralkyl $-N\begin{smallmatrix}lower\ alkyl\\SO_2-aryl\end{smallmatrix}$ $-N\begin{smallmatrix}aralkyl\\SO_2-aryl\end{smallmatrix}$ $-SO_2-N\begin{smallmatrix}aryl\\aralkyl\end{smallmatrix}$ $-SO_2N\begin{smallmatrix}aryl\\lower\ alkyl\end{smallmatrix}$ $-SO_2N\begin{smallmatrix}aralkyl\\cyclohexyl\end{smallmatrix}$ and an alkyl group with 5 carbon atoms, Y stands for a substituent selected from the group consisting of hydrogen, chlorine and lower alkyl, R stands for a substituent selected from the class consisting of hydrogen, lower alkyl and aryl and $R_1$ stands for a member selected from the group consisting of hydrogen, lower alkyl and cyclohexyl.

2. The acid disazo dyestuff of the formula

[structure]

3. The acid disazo dyestuff of the formula

[structure]

4. The acid disazo dyestuff of the formula

[structure]

FRANZ FRISCH.

REFERENCES CITED

The following references are of record in the file of this patent:

UNITED STATES PATENTS

| Number | Name | Date |
|---|---|---|
| 2,222,749 | Krebser | Nov. 26, 1940 |

FOREIGN PATENTS

| Number | Country | Date |
|---|---|---|
| 402,546 | France | Oct. 11, 1909 |